(12) United States Patent
Büttner

(10) Patent No.: US 6,651,995 B1
(45) Date of Patent: Nov. 25, 2003

(54) VEHICLE AXLE SUSPENSION

(75) Inventor: Josef Büttner, Waldaschaff (DE)

(73) Assignee: Otto Sauer Achsenfabrik Keilberg, Bessenbach-Keilberg (DE)

( * ) Notice: Subject to any disclaimer, the term of this patent is extended or adjusted under 35 U.S.C. 154(b) by 0 days.

(21) Appl. No.: 09/869,717

(22) PCT Filed: Jan. 3, 2000

(86) PCT No.: PCT/EP00/00005

§ 371 (c)(1),
(2), (4) Date: Jul. 3, 2001

(87) PCT Pub. No.: WO00/40431

PCT Pub. Date: Jul. 13, 2000

(30) Foreign Application Priority Data

Jan. 4, 1999 (DE) .................................. 199 00 087
Jul. 13, 1999 (DE) .................................. 299 11 920 U

(51) Int. Cl.⁷ .............................................. B60G 11/00
(52) U.S. Cl. ................................ 280/124.157; 267/122
(58) Field of Search ...................... 280/124.157, 6.15, 280/6.151; 267/122, 64.21, 64.24

(56) References Cited

U.S. PATENT DOCUMENTS

| | | | | |
|---|---|---|---|---|
| 2,926,011 A | * | 2/1960 | Slemmons et al. | 267/64.27 |
| 2,960,333 A | | 11/1960 | McGavern et al. | |
| 2,999,681 A | * | 8/1961 | Muller et al. | 267/64.27 |
| 3,083,059 A | * | 3/1963 | Biszantz | 298/17 S |
| 3,682,464 A | * | 8/1972 | Krejcir | 267/64.24 |
| 3,790,147 A | * | 2/1974 | Owen | 267/64.21 |
| 4,174,827 A | * | 11/1979 | Hirtreiter et al. | 267/64.24 |
| 4,647,025 A | * | 3/1987 | Gold | 267/122 |
| 4,854,557 A | * | 8/1989 | Goshima et al. | 267/35 |
| 4,878,691 A | * | 11/1989 | Cooper et al. | 280/124.128 |
| 5,015,004 A | * | 5/1991 | Mitchell | 280/5.521 |
| 5,024,462 A | * | 6/1991 | Assh | 267/241 |
| 5,201,499 A | * | 4/1993 | Elliott et al. | 152/559 |
| 5,286,010 A | * | 2/1994 | Pahl et al. | 267/122 |
| 5,669,597 A | * | 9/1997 | Rittstieg et al. | 267/64.17 |
| 5,859,692 A | * | 1/1999 | Ross et al. | 267/64.19 |
| 5,954,316 A | * | 9/1999 | Voss | 267/64.21 |
| 6,036,180 A | * | 3/2000 | Ecktman | 267/64.27 |
| 6,036,201 A | * | 3/2000 | Pond et al. | 280/5.514 |
| 6,068,276 A | * | 5/2000 | Kallstrom | 280/124.157 |

FOREIGN PATENT DOCUMENTS

| | | |
|---|---|---|
| DE | 1 048 165 | 12/1958 |
| DE | 1 063 427 | 1/1960 |
| DE | 1 127 233 | 4/1962 |

(List continued on next page.)

Primary Examiner—Brian J. Johnson
Assistant Examiner—Kelly Campbell
(74) Attorney, Agent, or Firm—Wenderoth, Lind & Ponack, L.L.P.

(57) ABSTRACT

An axle suspension for air-suspended utility vehicles and the like with which the vehicle chassis is supported by a pneumatic spring. The spring is configured as a plunger piston assembly, is preferably cylindrical, and has a plunger piston (6) that is provided for supporting and guiding a pneumatic spring bellows (5). The pneumatic spring bellows is connected via an upper mounting plate (7) to the vehicle chassis resting thereupon and is connected, e.g. via a lower base plate to the top of the plunger piston which is supported, for example, on a leaf spring assembly (1). The vehicle axle suspension is characterized in that either a downward pointing collar (10) of a predetermined height is provided on the peripheral edge (20) of the mounting plate, and the pneumatic spring bellows is placed with the upper end thereof on the lower end of the collar at a corresponding distance from the primary plane of extension of the mounting plate, or the pneumatic spring bellows is fastened to the peripheral edge of the mounting plate itself and is enclosed underneath the mounting plate by at least one collar of a predetermined height.

23 Claims, 11 Drawing Sheets

FOREIGN PATENT DOCUMENTS

| | | |
|---|---|---|
| DE | 1 505 315 | 10/1969 |
| DE | 35 26 156 | 1/1987 |
| DE | 196 07 804 | 5/1997 |
| DK | 000552458 A1 * | 7/1993 ................. 267/32 |
| EP | 0 250 820 | 1/1988 |
| EP | 578 326 | 1/1994 |
| FR | 2 672 354 | 8/1972 |
| GB | 837 358 | 6/1960 |
| GB | 935 831 | 9/1963 |
| GB | 964 138 | 7/1964 |

* cited by examiner

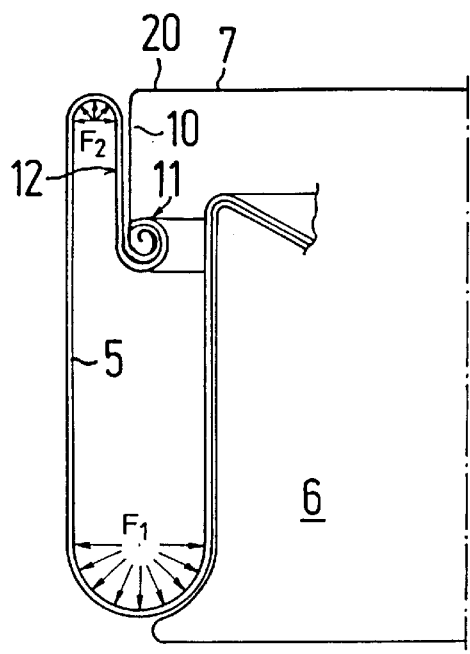
FIG.6
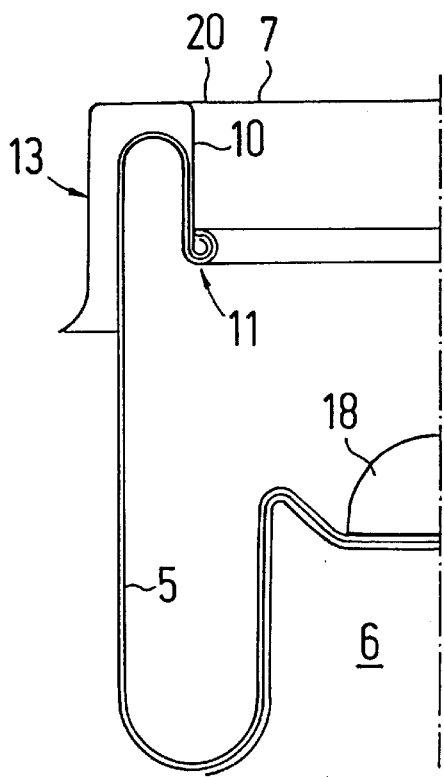
FIG.7
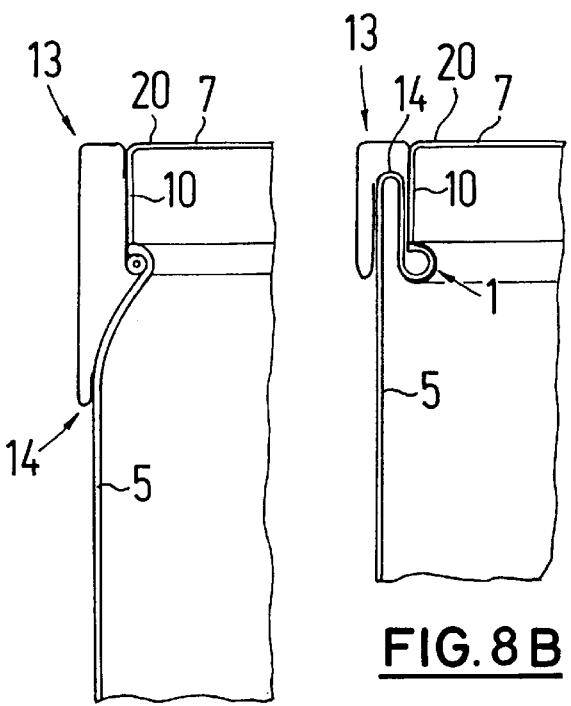
FIG.8A
FIG.8B

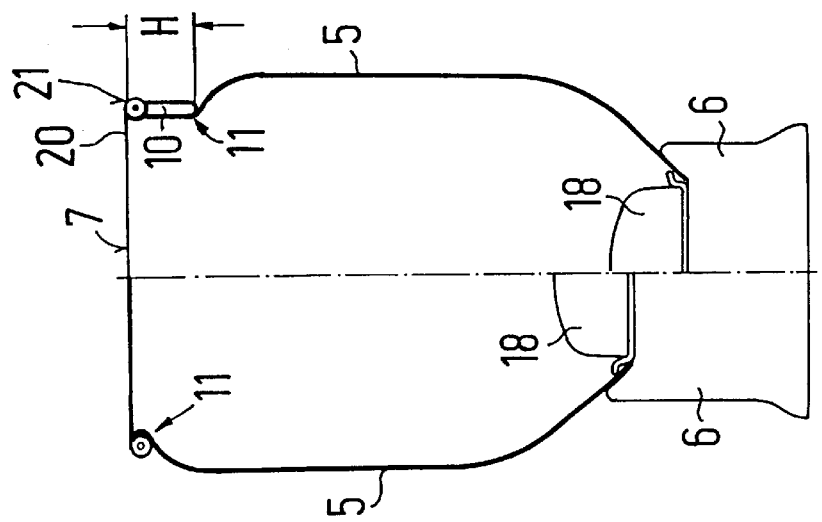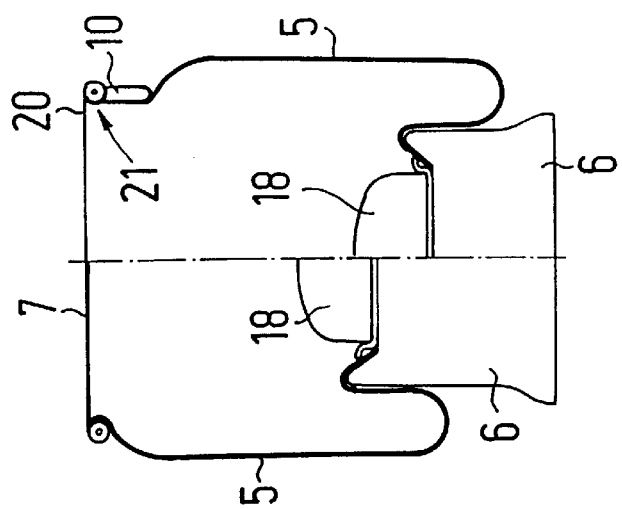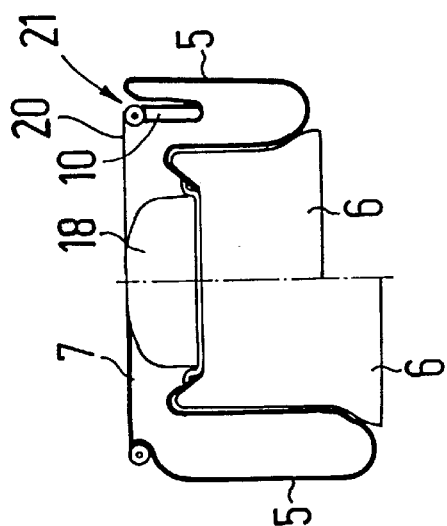

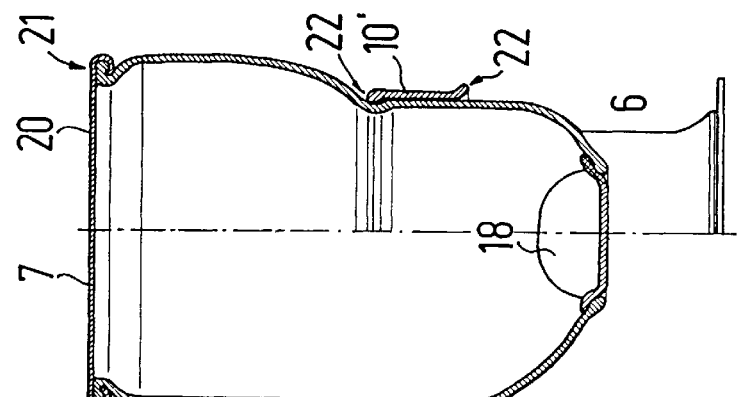
FIG.12A
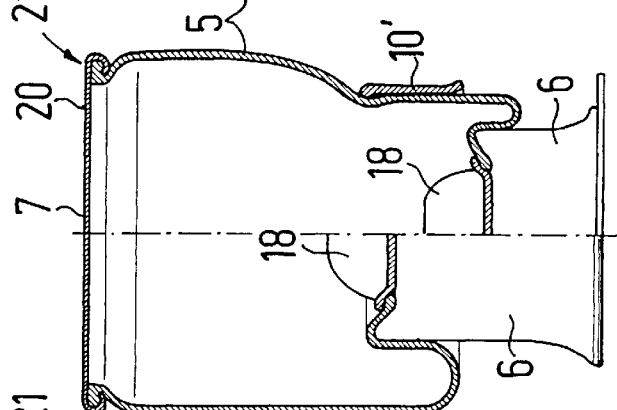
FIG.12B₁
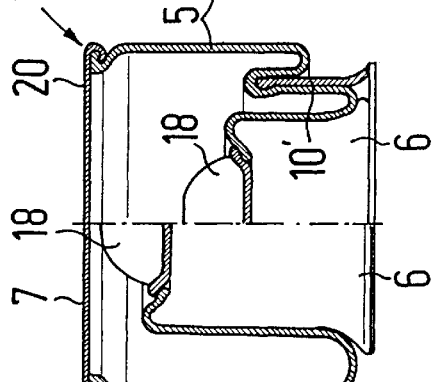
FIG.12B₂
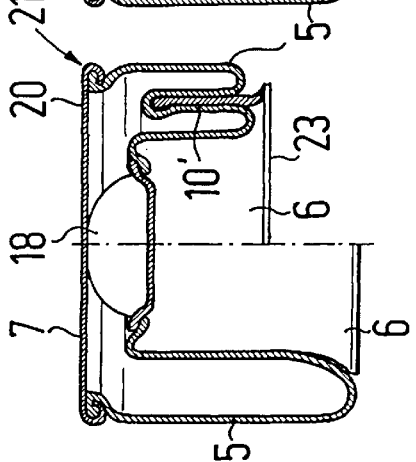
FIG.12C

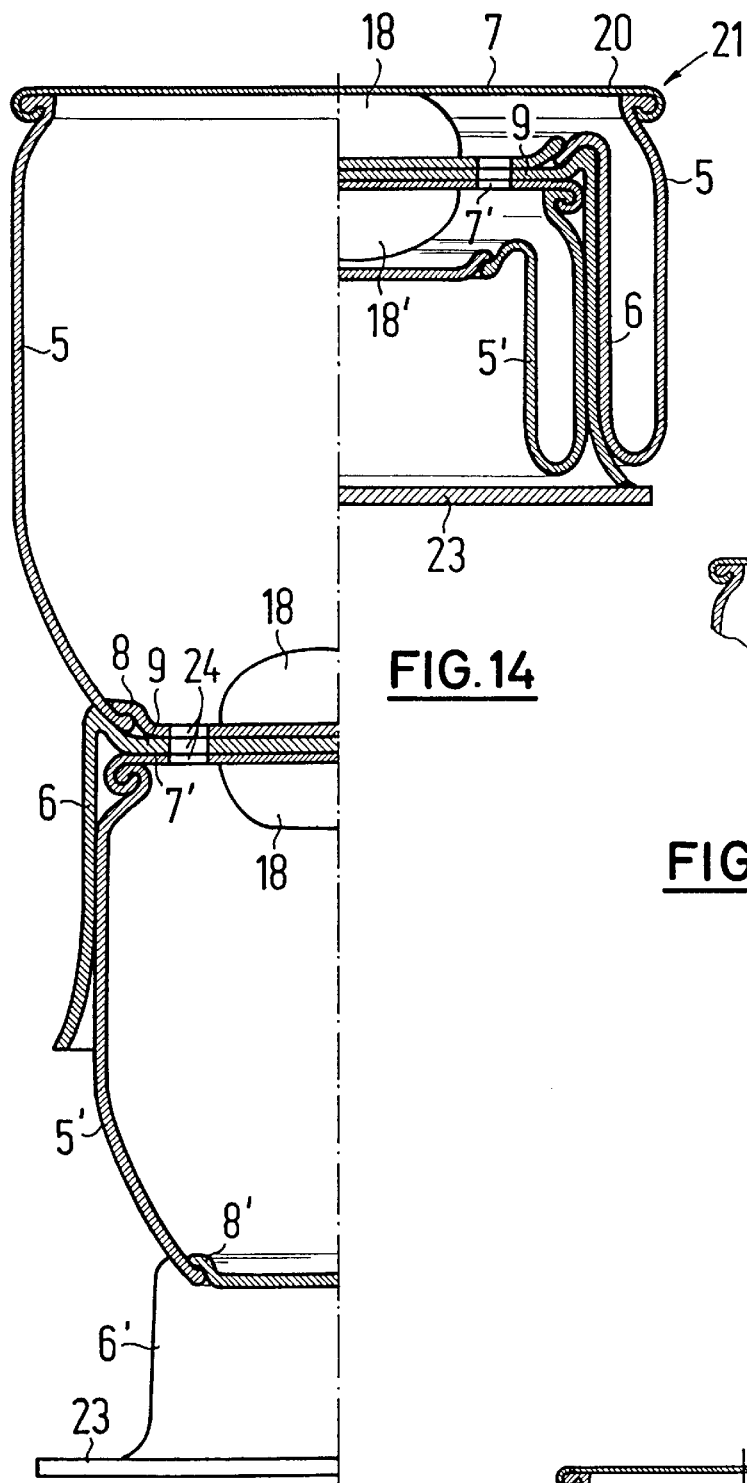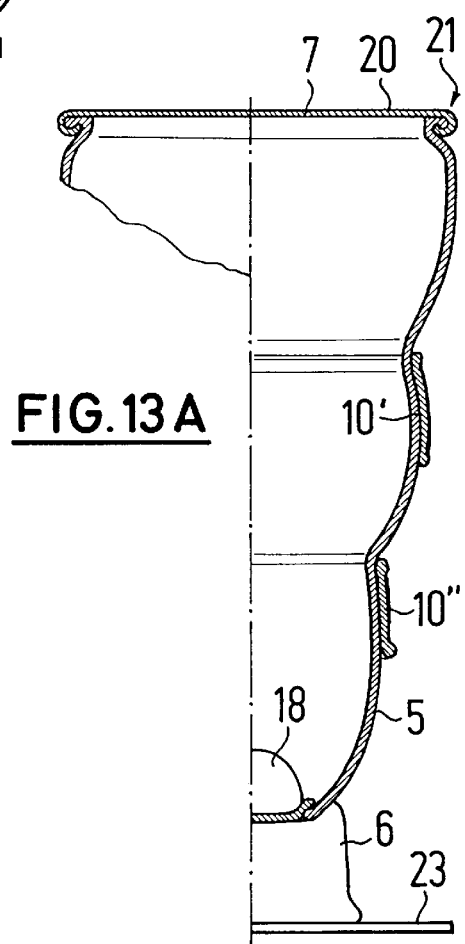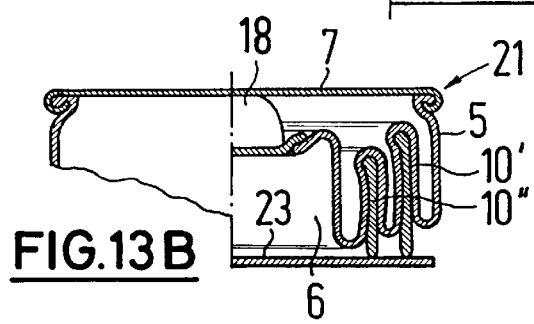

VEHICLE AXLE SUSPENSION

BACKGROUND OF THE INVENTION

1. Field of the Invention

The invention concerns an axle suspension for air-suspended utility vehicles and the like in which the vehicle chassis is supported by a pneumatic spring for the support and guidance of pneumatic spring bellows. The bellows are connected by means of an upper mounting plate with the vehicle chassis resting on it, and e.g., by means of a bottom plate with the top of a plunger piston which is e.g. braced on a spring leaf assembly.

2. Description of Related Art

Such an axle suspension is for example known from DE 42 01 629 C1. The known arrangement features at least one spring leaf assembly on either side of the perpendicular longitudinal center plane of the vehicle. The spring leaf assembly is hinged at its front end to a chassis-mounted bearing and at a distance from it rigidly connected with an axle housing and at its rear end supports the vehicle chassis by means of the pneumatic spring. The purpose of this axle suspension was to make the greatest possible axle spring travel of up to 450 mm possible. With this known method this purpose is achieved by the fact that the geometric central axis of the plunger piston and in essence the plunger piston casing as seen from the point of support have a concave curvature. The resultant more favorable motion sequence achieves that the critical distance of the upper inner corner of the spring is configured as a plunger piston assembly, is preferably cylindrical and has a plunger piston intended plunger piston from the pneumatic spring bellows increases. This results in greater axle spring travel.

In addition, it can be seen from a comparison of the characteristic curves of the plunger piston (axle load over axle spring travel) that with the use of such curved plunger pistons at equal bellows pressure, the axle load is held over a longer axle spring excursion than with air suspensions with a straight plunger piston. This guarantees safe raising of a loaded vehicle.

It has become clear that, for example, for the use of axle suspensions for vehicles in interchange operations, i.e. for instance for trailers/semitrailers used in these operations there is a need for still greater axle spring travel in order to be able to handle quite different parking heights which vary by more than 450 mm.

The purpose of the present invention is to meet this requirement for an axle suspension of a similar type in a simple manner.

SUMMARY OF THE INVENTION

The purpose is essentially achieved by the fact that there is either at the edge of the mounting plate a downward pointing collar of a predetermined height and top end of the pneumatic spring bellows is attached to the bottom end of the collar at a corresponding distance from the primary plane of extension of the mounting plate, or that the pneumatic spring bellows are attached to the peripheral edge of the mounting plate itself and are surrounded below the mounting plate by at least one collar of a predetermined height (7).

The first alternative achieves that the maximum travel of the pneumatic spring bellows when these are pressurized is extended by 2× the height of the collar if at equal plunger piston length, pneumatic spring bellows lengthened by 1× the height of the collar are used, and by 1× the height of the collar if with a plunger piston shortened by 1× the height of the collar, the same pneumatic spring bellows are used. This can be explained by the fact that when the pneumatic spring bellows are depressurized, as happens when the vehicle chassis is lowered to its lowest level, the top part of the bellows rolls over the external peripheral surface of the collar because of the existing geometric ratios and so forms an additional fold there. Compared to a conventional pneumatic spring it is in this way possible to achieve either a decreased blocking length or an increased bellows deflection, and therefore axle spring travel.

The second alternative has the advantage that the pneumatic spring bellows can be attached to the unchanged mounting plate as before and with the use of the same plunger piston and therefore equal blocking height, but with pneumatic spring bellows lengthened by 2× the height of the collar, the maximum axle spring travel is increased by 2× the height of the collar, and by 1× the height of the collar, if with a plunger piston shortened by 1× the height of the collar, pneumatic spring bellows lengthened by 1× the height of the collar are used.

In a further development of the inventive thought, the collar like the adjacent area of the pneumatic spring bellows is of a more or less circular and cylindrical design, e.g. a separate hoop. This contributes to easy manufacture, low-weight construction and reliable operation.

It is particularly advantageous for the operation of the novel plunger piston configuration if the collar mounted on the mounting plate has a diameter which basically matches the diameter of the top area of the pneumatic spring bellows. This enables the top edge of the pneumatic spring bellows during the lowering of the vehicle chassis to slide comfortably over the collar to form a double-layer fold and to unroll without problem from the collar when the vehicle chassis is raised.

Advantageously, in the first alternative of the invention, the collar which like the mounting plate itself is, for example, made of steel plate, is connected at its bottom end to the top end of the pneumatic spring bellows by means of a bead.

In the second alternative the peripheral edge of the mounting plate is advantageously connected with the top end of the pneumatic spring bellows by means of a bead which can be done without difficulty.

In the first alternative the collar can be connected rigidly, e.g. in one piece, with the mounting plate.

In the second alternative a connection of the at least single collar with the mounting plate is not necessary. The collar is rather situated on the external circumference of the pneumatic spring bellows where it can, for example, rest against the bead of the mounting plate edge and may there, for example, also be adapted in its geometric shape to the bead. However, it may also sit at a suitable distance from the mounting plate on the circumference of the pneumatic spring bellows.

To avoid particularly in the first alternative accumulation of dirt in the space between the fold of the pneumatic spring bellows forming near the collar and the external circumference of the collar connected to the mounting plate or resting against it when the vehicle chassis is fully or partially lowered, the external circumference of the collar may be surrounded by a covering that is closed at the top and whereby there is a space between collar and covering. The cover is designed in such a way that the forming of the fold at the top edge of the pneumatic spring bellows during lowering of the vehicle chassis takes place in the space between the covering and the collar.

As a further development of this thought the covering may also consist of a flexible material, may rest with its bottom peripheral edge against the exterior of the pneumatic spring bellows and be taken along by them so that the accumulation of dirt as referred to above is avoided.

To prevent damage of the pneumatic spring bellows at the edges of the collar, the latter may be rounded.

It is also possible to utilize the folding of the pneumatic spring bellows for the reduction of the blocking height and the increase of the maximum pneumatic spring bellows travel for an axle suspension of this type or an axle suspension of the type discussed previously, if a second set of pneumatic spring bellows is arranged in the plunger piston with a second plunger piston at the bottom end of this second set of pneumatic spring bellows.

In this case the second set of pneumatic spring bellows can be connected to the top of the plunger piston by means of a second mounting plate.

Further purposes, features, advantages and applications of the invention under review follow from the description below of embodiments of the invention supported by the drawings. All the features described and/or illustrated constitute alone or in any combination the subject of this invention, also independent of their summary in individual claims or of the interrelationships between claims.

BRIEF DESCRIPTIONS OF THE DRAWINGS

FIG. 2A shows a fully lowered vehicle chassis, FIG. 2B shows a vehicle chassis in traveling position and FIG. 2C shows a fully raised vehicle chassis;

Figure 4A:
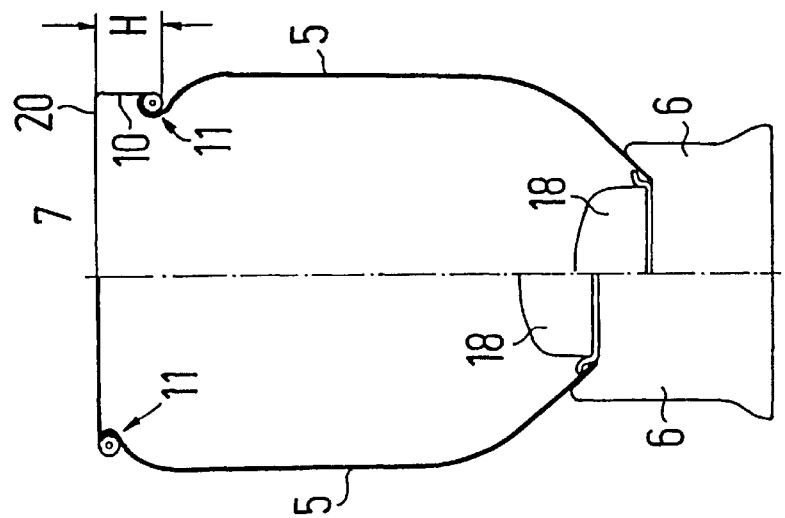
Figure 4B:
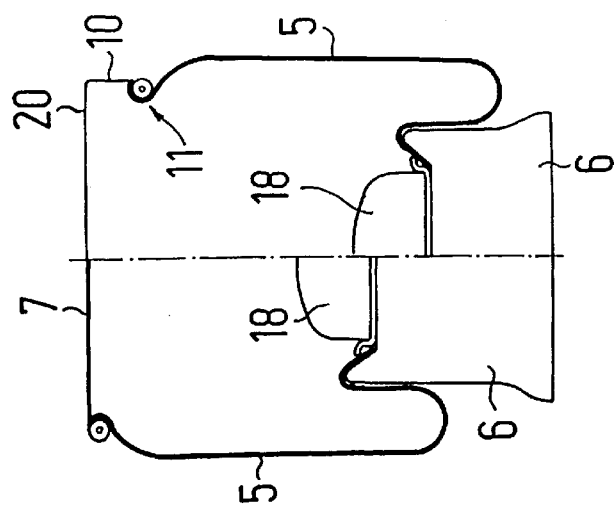
Figure 4C:
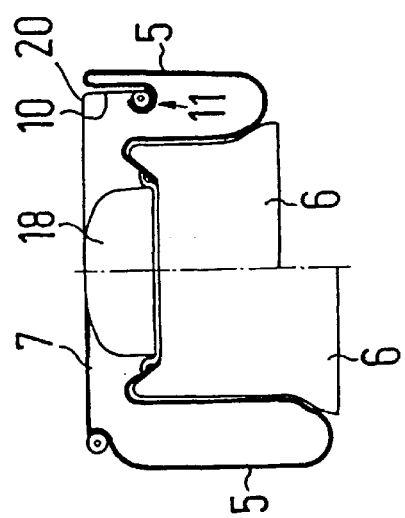
Figure 5A:
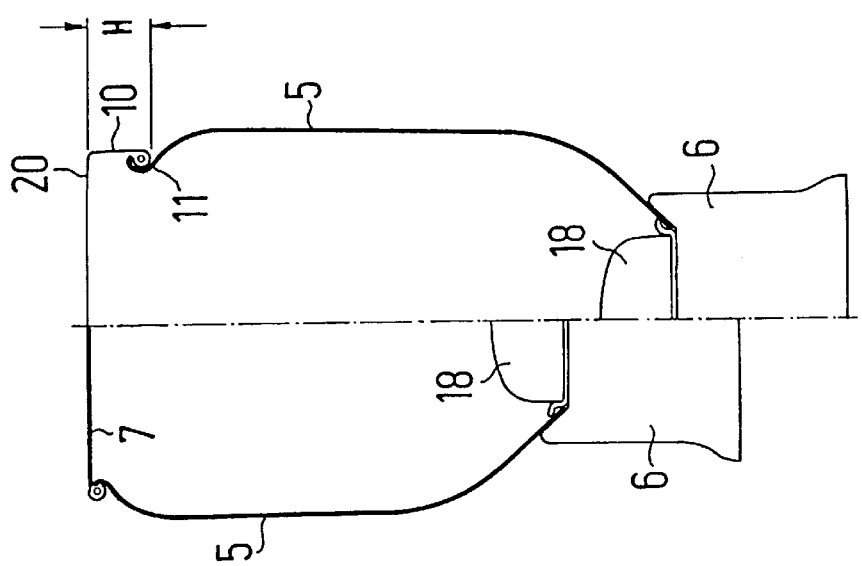
Figure 5B:
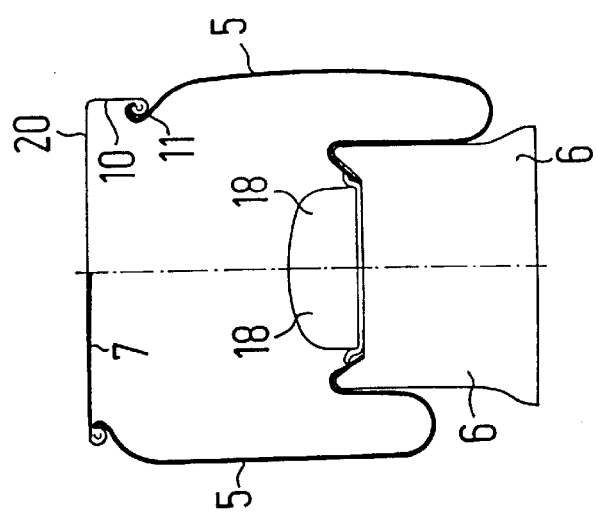
Figure 5C:
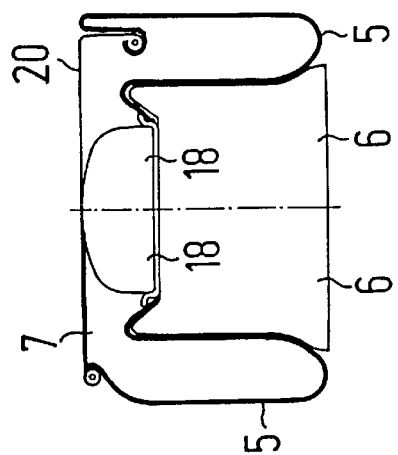
Figure 10A:
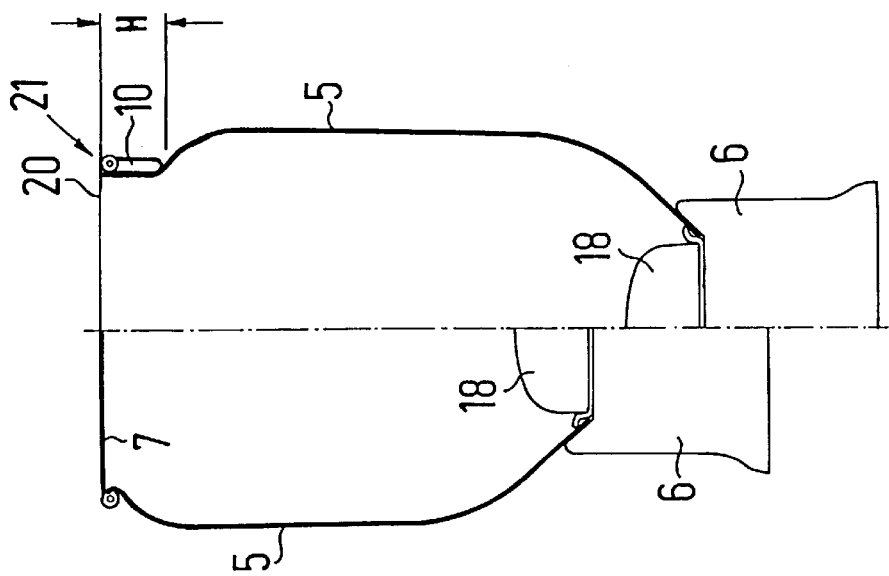
Figure 10B:
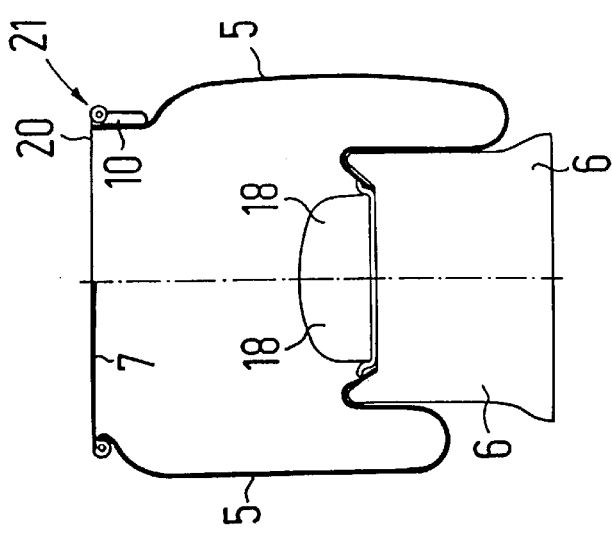
Figure 10C:
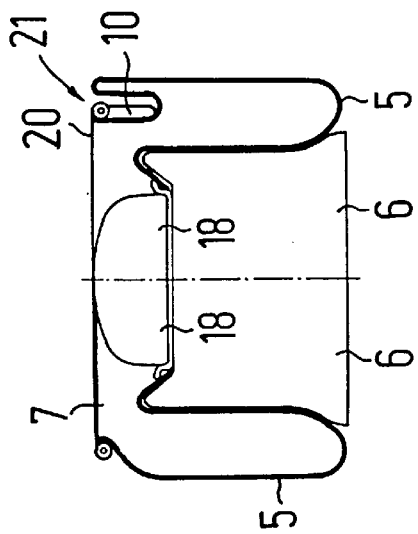
Figure 11C:
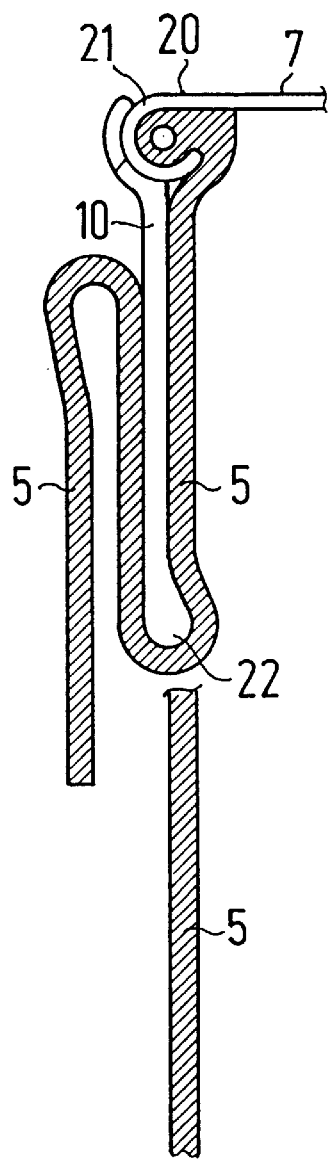
Figure 11B:
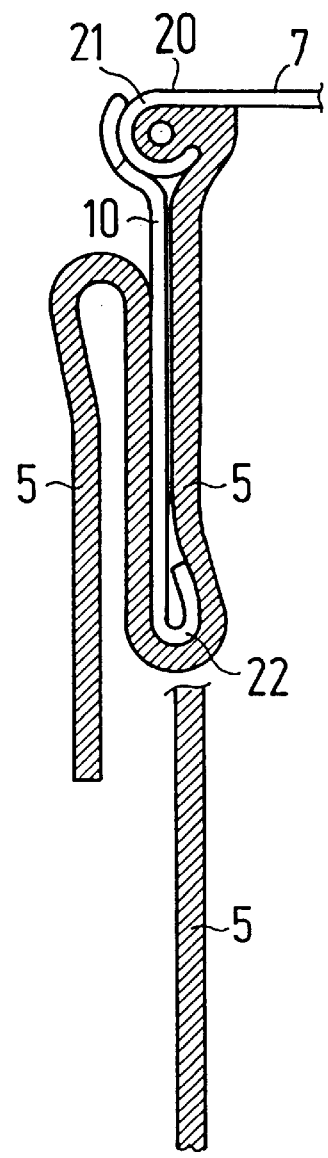
Figure 11A:
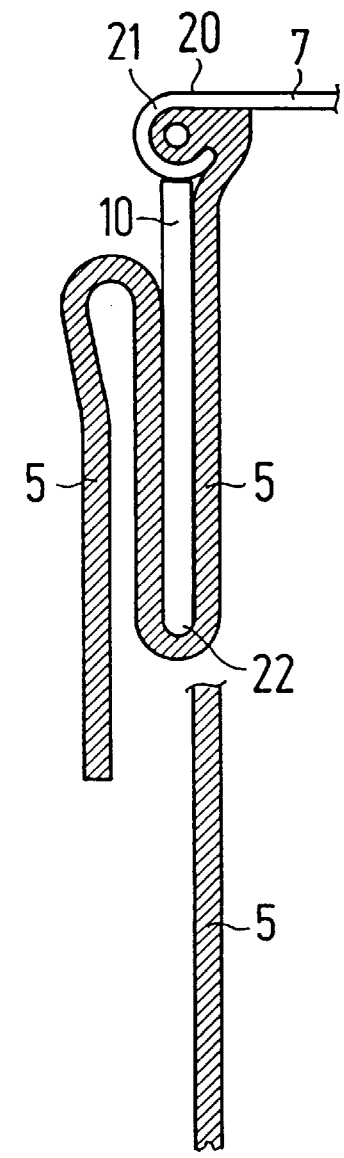

FIGS. 4A to 4C are views of a plunger piston assembly according to the state of the art (in each case the left half of the drawing) in comparison to a plunger piston assembly (in each case the right half of the drawing) in accordance with the first embodiment of the invention, with fully raised vehicle chassis (C), with the height of the vehicle chassis adjusted to traveling position (B) and with fully lowered vehicle chassis (A), whereby as proposed by the invention despite reduction of the plunger piston length and therefore the blocking length of the plunger piston assembly by the amount H (H= height of collar 10) (FIG. 4A) the same maximum air bellows travel (FIG. 4C) is achieved;

FIGS. 5A to 5C are illustrations similar to FIGS. 4A to 4C, whereby with equal plunger piston length and therefore equal blocking length of the plunger piston assembly (FIG. 5C), the increase of the pneumatic spring bellows length as proposed by the invention by the amount H (H=height of collar 10) the maximum air bellows travel (FIG. 5A) is increased by the amount 2H in accordance with the first embodiment of the invention;

FIG. 6 is an enlarged detail view of the top edge of the pneumatic spring bellows in the fully lowered position of the vehicle chassis to explain the working of the axle suspension as per invention;

FIG. 7 is an illustration that is more or less identical to FIG. 6 showing a further development of the first embodiment of the invention;

FIGS. 8A and 8B show the top edge of the pneumatic spring bellows in the fully raised position of the vehicle chassis (A) and in the fully lowered position of the vehicle chassis (B) in an illustration as per FIGS. 5 and 6 for yet another development of the first embodiment of the invention;

FIGS. 9A to 9C are views similar to FIGS. 4A to 4C to illustrate the working of a second embodiment of the invention with a shortened plunger piston;

FIGS. 10A to 10C are views similar to FIGS. 5A to 5C to illustrate the working of the second embodiment of the invention with increased air bellows travel;

FIGS. 11A to 11C are sectional views of the mounting plate according to the second embodiment of the invention, near its peripheral edge for three different embodiments;

FIGS. 12A to 12C are views that are similar to FIGS. 9A to 9C, whereby as proposed by the invention (in each case the right side of the figure) in comparison to the state of the art (in each case the left side of the figure) a collar in the form of a hoop at a distance from the mounting plate and a shortened plunger piston 6 are used;

FIGS. 13A and 13B are sectional views of pneumatic spring bellows equipped as per the invention with two mutually interspaced collars in the form of a hoop in the fully extended position (FIG. 13A) and the fully folded position (FIG. 13B); and FIG. 14 is a sectional view of a further embodiment of the invention achieved (improvement of the ratio maximum bellows springing to blocking height) by folding of the pneumatic spring bellows in a configuration with two staggered pneumatic spring bellows.

DETAILED DESCRIPTION OF THE INVENTION

Figures 1A, 1B:
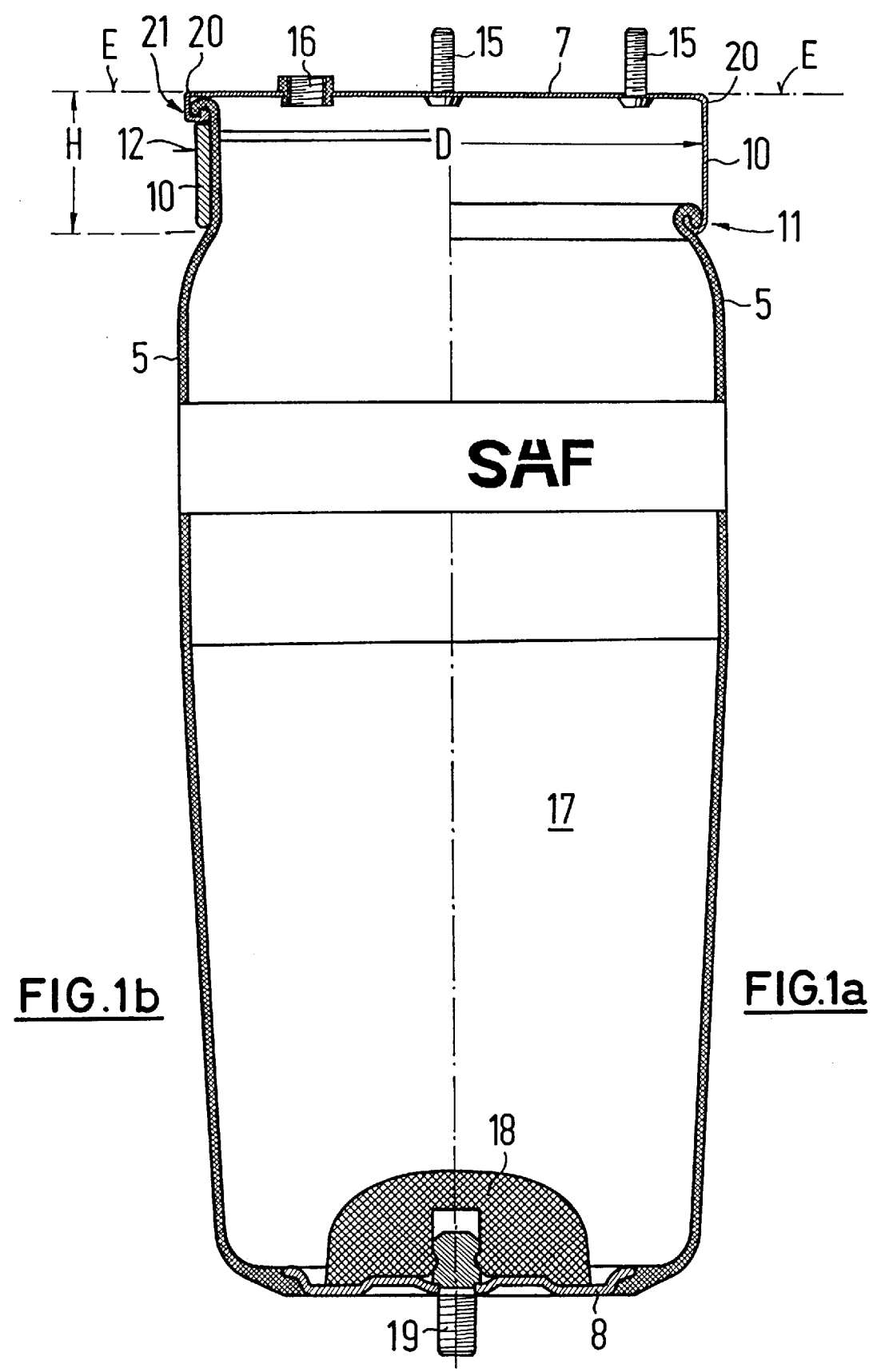
FIG. 1a is a vertical cross sectional view of a mounting plate with an integral collar and a pneumatic spring bellows attached to the latter by means of a bead in accordance with a first embodiment of the invention.
FIG. 1b is a vertical cross sectional of a mounting plate with a pneumatic spring bellows attached to its peripheral edge by means of a bead and collar surrounding the bellows in accordance with a second embodiment of the invention.

FIG. 1a (right half of FIG. 1) shows a vertical section of pneumatic spring bellows 5 attached as per the invention to the bottom end of a hollow cylindrical collar 10 e.g. by means of a bead 11. The collar 10 is preferably integral with the peripheral edge (20) of a mounting plate 7 of a pneumatic spring for the axle suspension of a utility vehicle. The bead 11 lies in a plane at a specified distance H from the primary plane of extension E of the essentially circular mounting plate 7. The mounting plate 7 can be attached to the vehicle chassis of the air-suspended utility vehicle (cf. FIGS. 3A to 3C) by means of threaded bolts 15. The mounting plate 7 features a passage nozzle 16 for the pressurization and depressurization of the bellows interior space 17. The top end of the pneumatic spring bellows 5, the collar 10 and the mounting plate 7 have practically the same diameter D.

At the lower end of the pneumatic spring bellows 5, which in the case illustrated narrows slightly towards-the bottom, a vulcanized bumper pad 18 is fastened on a base plate 8. The bumper pad 18 strikes against the top mounting plate 7 when the pneumatic spring bellows 5 (cf. FIG. 3A) is fully depressurized. The bumper pad.18 can however also be mounted on the underside of the mounting plate 7 so that when the bellows is depressurized the movable base plate 8 strikes against the fixed bumper pad 18. Furthermore, a threaded pipe 19 is mounted in the base plate 8 and serves for the connection of the base plate 8 and therefore the lower end of the pneumatic spring bellows 5 with a plunger piston 6 of curved (cf. FIGS. 3A to 3C) or of straight, more or less bell-shaped design (cf. FIGS. 4A to 4C).

Figure 2A:
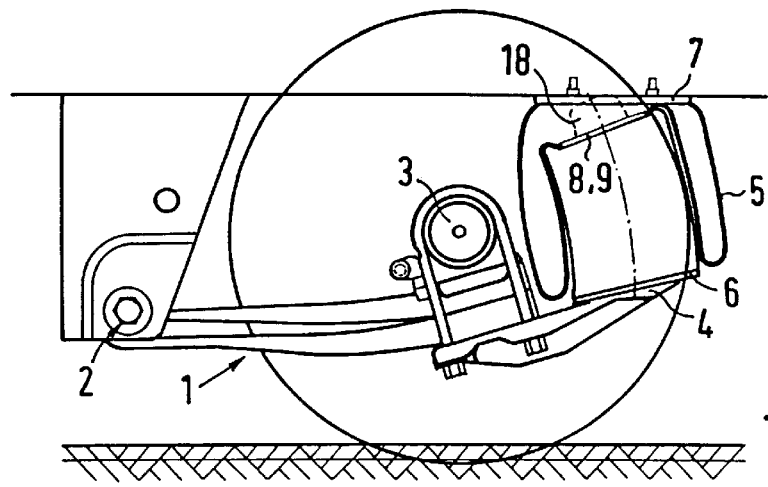
FIGS. 2A to 2C are schematic side views of an axle suspension according to the state of the art near a vehicle axle and, specifically.
Figure 2B:
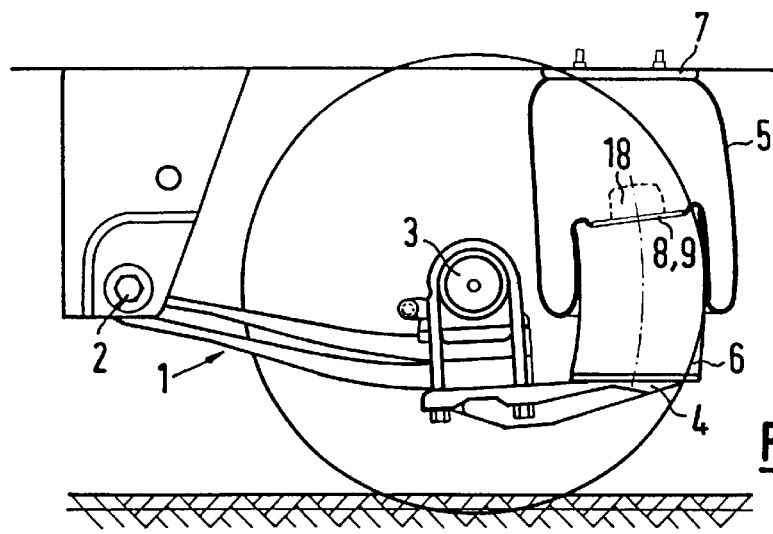
Figure 2C:
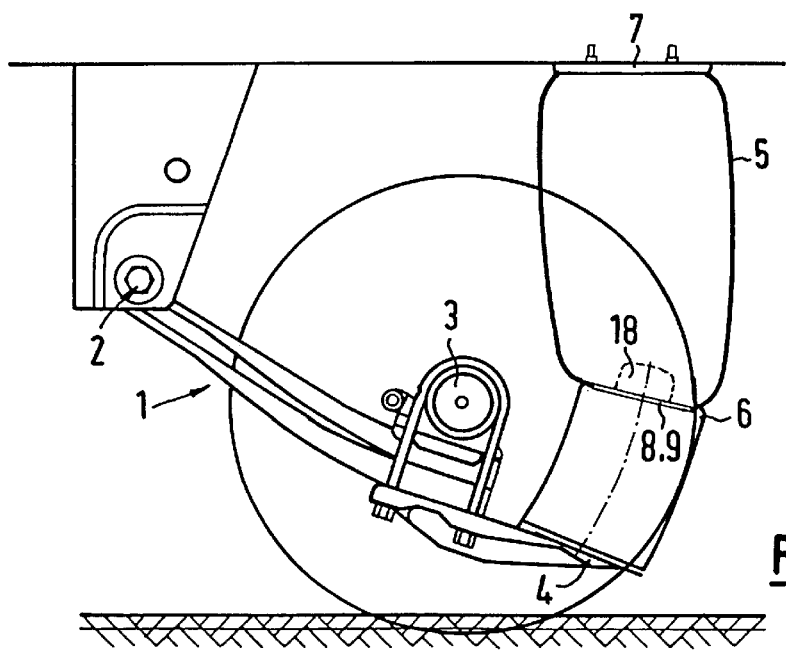

The pneumatic spring bellows 5 attached in this manner to the mounting plate 7 form together with the plunger piston, not shown in FIG. 1a, a pneumatic spring in the form of a plunger piston assembly e.g. of an axle suspension for air-suspended utility vehicles and the like according to the state of the art as illustrated in FIGS. 2A to 2C. However, this type of pneumatic spring is also suitable for other air-suspended axle aggregates.

With the alternative as per FIG. 1b, the pneumatic spring bellows 5 is attached in a conventional manner to the peripheral edge 20 of the mounting plate 7 by means of a bead 21. Adjacent to the bead 21, the pneumatic spring bellows 5 encompass a collar 10 in the form of an independent hoop.

A known axle suspension, such as of the type shown in FIGS. 2A to 2C has at least one leaf spring assembly I on either side of the perpendicular longitudinal center axis of the vehicle. The leaf spring assembly is hinged at its front end to a chassis-mounted bearing 2, and at a distance from it rigidly connected, preferably under tension, to the axle housing 3. At the rear end 4 of the spring leaf assembly 1, the vehicle chassis, not shown in FIGS. 2A to 2C, is supported by the pneumatic spring in the form of a plunger piston assembly featuring the preferably cylindrical plunger piston 6, which serves for the support and guidance of the pneumatic spring bellows 5. FIGS. 2A to 2C also illustrate how the pneumatic spring bellows 5 is connected via the mounting plate 7 with the vehicle chassis resting on it and e.g. via the base plate 8 with the top 9 of the plunger piston 6. The plunger piston 6 is in turn braced on the free rear end 4 of the spring leaf assembly 1. FIGS. 2A to 2C each illustrate different positions of the spring leaf assembly 1, whereby in FIG. 2A that position of the spring leaf assembly 1 relative to the vehicle chassis is illustrated in which the vehicle chassis is lowered to the maximum and the plunger piston 6 therefore strikes against the mounting plate 7 through its upper bumper pad 18. FIG. 2C shows the extended shape assumed by the pneumatic spring bellows 5 when the leaf spring assembly 1 is fully extended to achieve the greatest possible bellows and therefore axle spring excursion. The maximum bellows and therefore axle spring excursion is determined by the maximum length of the pneumatic spring bellows 5 (as per FIG. 2C) plus the vertical length of the plunger piston 6. With conventional axle aggregates it is possible to achieve axle spring excursions of up to 450 mm in this manner. However, there is a limit due to the fact that the minimum length of the pneumatic spring 5, 6 is essentially determined by the effective length of the plunger piston 6 as can be seen in FIG. 2A. If one were to try with an assembly as per FIGS. 2A to 2C to increase the possible bellows and therefore axle spring travel by lengthening of the plunger piston 6 and/or of the pneumatic spring bellows 5, more space would be required to accommodate the pneumatic spring 5, 6 in the fully lowered position of the vehicle chassis because of the greater blocking length. The space available under the vehicle chassis imposes a limit on the lengthening of the plunger piston 6 and/or the pneumatic spring bellows 5.

Figure 3A:
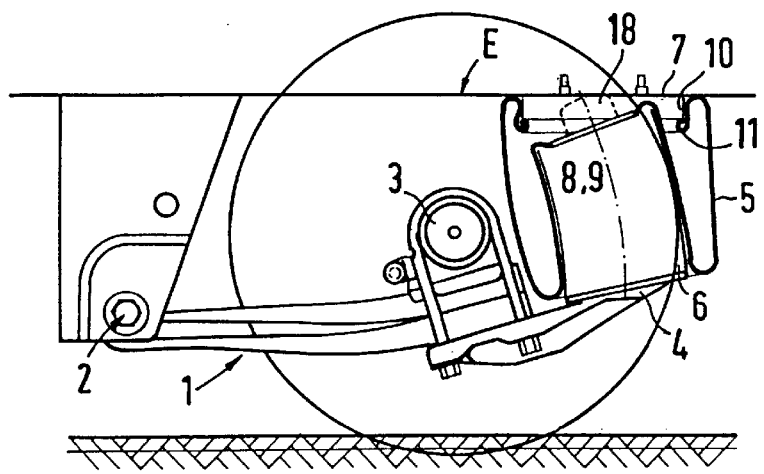
FIGS. 3A to 3C are illustrations similar to FIGS. 2A to 2C, but for an axle suspension designed according to the first embodiment of the invention at equal plunger piston length and bellows length increased by the collar height H, whereby the top of the pneumatic spring bellows rolls over the collar of the mounting plate.
Figure 3B:
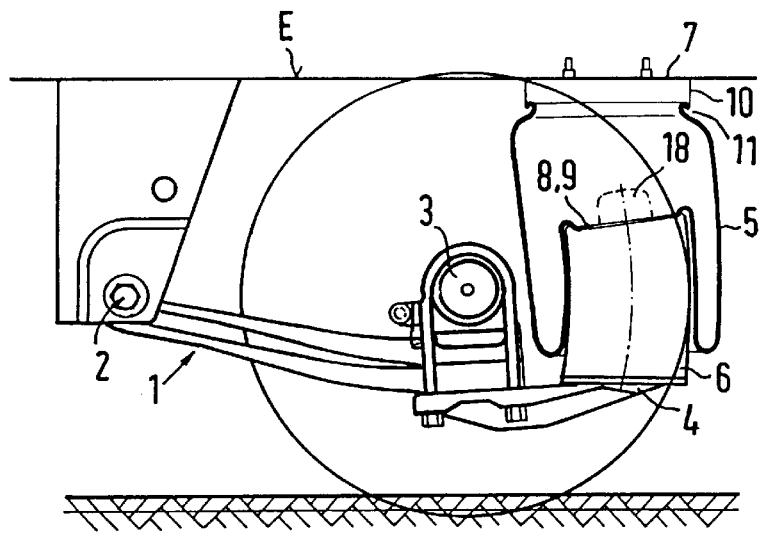
Figure 3C:
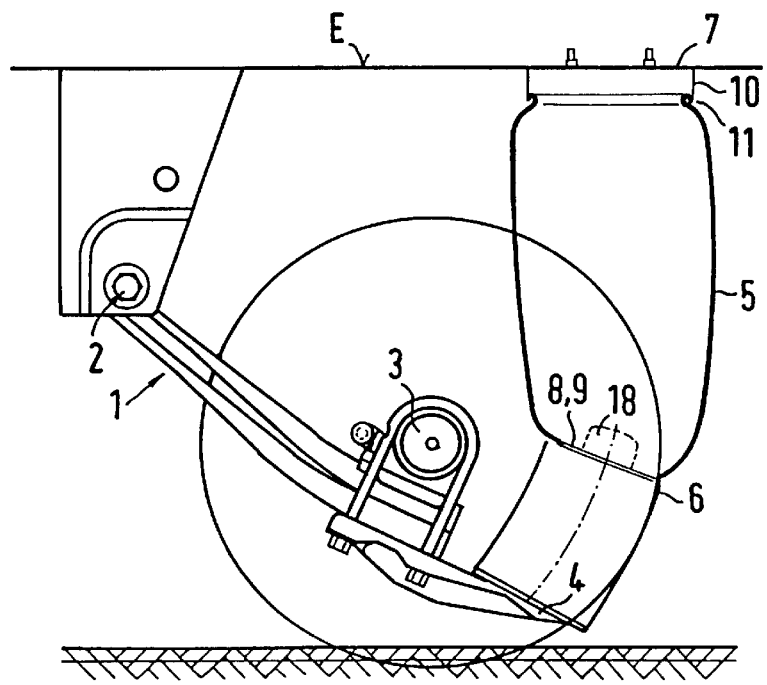

As can be seen in FIG. 1 a, and particularly in FIGS. 3A to 3C, the mounting plate 7 for this embodiment of the invention varies from the state of the art in that it is equipped with a downward pointing collar 10 at whose bottom end the top end of the pneumatic spring bellows 5 is fitted e.g. by means of a bead 11 at a distance H from the primary plane of extension E of the mounting plate 7. As can be seen in FIGS. 3A to 3C this makes a lengthening of the pneumatic spring bellows 5 by the measurement H possible without changing the length of the plunger piston 6. Consequently the maximum achievable air bellows travel is increased by 2×H, i.e. twice the height of the collar 10. This is the result of the depressurization of the pneumatic spring bellows 5 for the lowering of the vehicle chassis and the entry of the plunger piston 6 into the bellows interior space 17, when the top part of the pneumatic spring bellows 5 rolls up on the external circumference of the collar 10 and forms a double-layer fold there.

From the detailed view of FIG. 6 it is clear that when the pneumatic spring bellows 5 are pressurized, due to the area ratios the upper edge of the pneumatic spring bellows 5 will unroll from the external circumferential surface of the collar 10 first, before the plunger piston 6 moves out of the pneumatic spring bellows 5. This is because of the geometric ratios (the diameter of the plunger piston 6 being necessarily smaller than the diameter D of the collar 10) the fold of the pneumatic spring bellows 5 resting against the plunger piston 6 is larger than the fold resting against the collar 10. That is why the force $F_1$ acting on the fold of the pneumatic spring bellows 5 resting against the plunger piston 6 is greater than the force $F_2$ acting on the fold resting against the external circumferential surface 12 of the collar 10. During the depressurization of the pneumatic spring bellows 5 and therefore the lowering of the vehicle chassis, the lower fold of the pneumatic spring bellows 5 therefore rolls up on the plunger piston 6 first and then the upper fold on the external circumferential surface 12 of the collar 10 until the plunger piston 6 comes to rest at its top stop against the mounting plate 7 through the bumper pad 18.

In FIGS. 4A to 4C the operation and the advantages of an axle assembly equipped with a plunger piston assembly 5, 6 as per the first embodiment of the invention in comparison with the state of the art are easy to see. In the left half of the drawings, a plunger piston assembly 5, 6 according to the state of the art is shown, in the right half a plunger piston 6 shortened by the amount H (H=height of the collar 10). FIG. 4A shows the configuration in which the maximum possible bellows spring excursion is reached. As shown in FIG. 4A the plunger piston assembly 5, 6 according to the state of the art and as per invention are based on the same maximum bellows travel. This means, that as proposed by the invention, a plunger piston 6 shortened by the distance H can be used with pneumatic spring bellows 5 of the same length. FIG. 4B illustrates the configuration in which the leaf spring assembly 1 and therefore the axle aggregate of the vehicle is in an intermediate traveling position. Finally, FIG. 4C illustrates the stop position of the plunger piston 6 at the top in which the bumper pad 18 rests against the mounting plate 7. This demonstrates that at equal maximum bellows travel (FIG. 4A) the pneumatic spring, as per invention, in the fully depressurized condition (FIG. 4C) can have a blocking length shortened by the distance H. Conversely it means, as illustrated in FIGS. 5A to 5C, that because of the collar 10 being integrated with the mounting plate 7, when plunger pistons 6 of equal height are used, the pneumatic spring bellows 5 can be lengthened by the amount H. With the axle suspension, as per invention, a maximum bellows travel can therefore be achieved which is increased by the amount of 2×H, i.e. twice the height of the collar 10 without an increase in blocking length of the pneumatic spring in the fully depressurized condition.

As shown in FIG. 7 the outside edge of the mounting plate 7 features a covering 13 which projects over the top fold of the pneumatic spring bellows 5. The space between the external wall of the covering 13 and the collar 10 is so dimensioned that the folding occurs on the external circumferential surface 12 of the collar 10 under the covering 13. This prevents the accumulation of dirt between the top fold of the pneumatic spring bellows 5 and the collar 10.

FIGS. 8A and 8B illustrate another type of covering 13. This is made of flexible material and rests with its bottom peripheral edge 14 against the wall of the pneumatic spring bellows 5. During the forming of the top fold of the pneumatic spring bellows 5, the bottom peripheral edge 14 is carried along with the wall of the pneumatic spring bellows 5 and partly rolled up with it. Other types of coverings are of course possible.

FIGS. 9A to 9B illustrate the operation of the plunger piston assembly for the second embodiment of the invention whereby the pneumatic spring bellows 5 are installed directly at the peripheral edge 20 of the mounting plate 7 similar to FIGS. 4A to 4C. Here too the plunger piston 6 (and therefore the blocking length) is shortened by 1×H (=height of the independent collar 10). The same maximum stroke length as with the state of the art is obtained by lengthening the pneumatic spring bellows 5 by 1×H.

FIGS. 10A to 10C reflect the conditions shown in the FIGS. 5A to 5C for the second embodiment of the invention.

FIGS. 11A to 11C show how the pneumatic spring bellows 5 roll on and off the collar 10 which is in the form of an independent hoop encircling the pneumatic spring bellows 5 immediately adjacent to the bead 21 of the peripheral edge 20 of the mounting plate 7. The three embodiments differ in their contact area with the bead 21 and their rounding 22 of the collar 10 at its bottom end.

In a variation of the second embodiment as per FIGS. 9A and 9C, the FIGS. 12A to 12C show variations of the second embodiment whereby the collar 10' is not arranged immediately adjacent to the mounting plate 7 on the circumference of the pneumatic spring bellows 5, but at a distance from the mounting plate 7. The distance has been chosen so that after the blocking height (FIG. 12C) has been reached during the lowering of the vehicle chassis, it is the bumper pad 18 that strikes against the mounting plate 7 and not the collar 10' with the pneumatic spring bellows material folded over it in order to spare it. The collar 10' positioned at a distance from the mounting plate 7 on the circumference of the pneumatic spring bellows 5 can be attached to it through vulcanization and other methods, e.g. gluing, molding and the like. While the illustrations in FIGS. 12B1 and 12B2 show two different traveling heights, FIG. 12A shows the maximum bellows travel. The plunger piston 6 has a base plate 23 as support for the collar 10'.

FIGS. 13A and 13B show yet another variation of the second embodiment whereby two collars 10', 10" are mounted at different distances from the mounting plate 7 on the external circumference of the pneumatic spring bellows 5. FIG. 13A shows the fully extended state of the pneumatic spring bellows 5, whereas FIG. 13B shows the fully folded pneumatic spring bellows 5, whereby the bumper pad 18 strikes against the mounting plate 7 according to the desired blocking height before the two collars 10', 10" reach this point. Both collars 10', 10" are braced below on the base plate 23 of the plunger piston 6. Because of the double folding of the pneumatic spring bellows 5 achieved in this case, the ratio of maximum bellows travel (FIG. 13A) to blocking height (FIG. 13B) is even more favorable. If need be there may even be more than two mutually interspaced collars.

In addition to the easy fastening of the pneumatic spring bellows 5 to the peripheral edge 20 of the mounting plate 7, the arrangements shown in FIGS. 9A to 13B have the further advantage that dirt cannot accumulate in the folds so that there is no need for a separate covering.

The embodiment shown FIG. 14 includes an axle suspension with a second set of pneumatic spring bellows 5' in the plunger piston 6, adjoined at their bottom end by a second plunger piston 6'. The second pneumatic spring bellows 5' can be connected by means of a second mounting plate 7' with the top 9 of the plunger piston 6. However, it is also possible to attach the lower pneumatic spring bellows 5' to the bottom edge of the first plunger piston 6. The interior of the two pneumatic spring bellows 5, 5' is in flow-through connection by means of mutually aligned holes 24 in the base plate 8 of the pneumatic spring bellows 5, the top 9 of the plunger piston 6 and the mounting plate 7' of the second set of bellows 5'. The left half of FIG. 14 shows the fully extended plunger piston assembly, the right half shows the fully collapsed assembly. Here too there is a double fold viz. one on the top pneumatic spring bellows 5 and one on the lower pneumatic spring bellows 5'.

List of Reference Symbols

1 Leaf spring assembly
2 Bearing
3 Axle housing
4 Rear free end
5, 5' Pneumatic spring bellows
6, 6' Plunger piston
7, 7' Mounting plate
8, 8' Base plate
9 Top
10, 10', 10" Collar
11 Bead
12 External circumferential surface 13 Covering
14 Peripheral edge
15 Threaded bolt
16 Passage nozzle
17 Bellows interior
18, 18' Bumper pad
19 Threaded pipe
20 Peripheral edge 21 Bead
22 Rounding
23 Base plate
24 Holes
D Diameter of collar 10
E Primary plane of extension of mounting plate 7
$F_1$ Force
$F_2$ Force
H Height of collar 10

What is claimed is:

1. An axle suspension for an air-suspended vehicle having a vehicle chassis, said axle suspension comprising:

an upper mounting plate adapted to be connected to the vehicle chassis;

a collar disposed on a peripheral edge of said upper mounting plate, said collar having a specified axial length and extending downwardly from said upper plate;

a pneumatic spring bellows having a top end connected to a bottom end of said downwardly extending collar; and a plunger piston connected to a lower end of said pneumatic spring bellows so that, when said pneumatic spring bellows is depressurized, one portion of said pneumatic spring bellows rolls over an external peripheral surface of said collar and forms an additional fold, wherein said plunger piston is cylindrical, and a top of said plunger piston is connected to the lower end of said pneumatic spring bellows by a bottom plate.

2. An axle suspension as claimed in claim 1, wherein a lower end of said plunger piston is supported on a spring leaf assembly.

3. An axle suspension as claimed in claim 1, wherein said collar and said pneumatic spring bellows are generally cylindrically shaped.

4. An axle suspension as claimed in claim 1, wherein said collar rests against said upper mounting plate and surrounds an outer peripheral portion of said pneumatic spring bellows.

5. An axle suspension for an air-suspended vehicle having a vehicle chassis, said axle suspension comprising:

an upper mounting plate adapted to be connected to the vehicle chassis;

a collar disposed on a peripheral edge of said upper mounting plate, said collar having a specified axial length and extending downwardly from said upper plate;

a pneumatic spring bellows having a top end connected to a bottom end of said downwardly extending collar; and a plunger piston connected to a lower end of said pneumatic spring bellows so that, when said pneumatic spring bellows is depressurized, one portion of said pneumatic spring bellows rolls over an external peripheral surface of said collar and forms an additional fold, wherein said collar is cylindrical and has an inner diameter that is substantially the same as a diameter of a top portion of said pneumatic spring bellows.

6. An axle suspension as claimed in claim 5, wherein the bottom end of said collar is connected to the top end of said pneumatic spring bellows by means of a bead.

7. An axle suspension for an air-suspended vehicle having a vehicle chassis, said axle suspension comprising:

an upper mounting plate adapted to be connected to the vehicle chassis;

a collar disposed on a peripheral edge of said upper mounting plate, said collar having a specified axial length and extending downwardly from said upper plate;

a pneumatic spring bellows having a top end connected to a bottom end of said downwardly extending collar; and a plunger piston connected to a lower end of said pneumatic spring bellows so that, when said pneumatic spring bellows is depressurized, one portion of said pneumatic spring bellows rolls over an external peripheral surface of said collar and forms an additional fold, wherein said collar is formed as a single piece with said upper mounting plate.

8. An axle suspension for an air-suspended vehicle having a vehicle chassis, said axle suspension comprising:

an upper mounting plate adapted to be connected to the vehicle chassis;

a collar disposed on a peripheral edge of said upper mounting plate, said collar having a specified axial length and extending downwardly from said upper plate;

a pneumatic spring bellows having a top end connected to a bottom end of said downwardly extending collar; and a plunger piston connected to a lower end of said pneumatic spring bellows so that, when said pneumatic spring bellows is depressurized, one portion of said pneumatic spring bellows rolls over an external peripheral surface of said collar and forms an additional fold, wherein said collar is integrally connected to said upper mounting plate.

9. An axle suspension for an air-suspended vehicle having a vehicle chassis, said axle suspension comprising:

an upper mounting plate adapted to be connected to the vehicle chassis;

a collar disposed on a peripheral edge of said upper mounting plate, said collar having a specified axial length and extending downwardly from said upper plate;

a pneumatic spring bellows having a top end connected to a bottom end of said downwardly extending collar;

a plunger piston connected to a lower end of said pneumatic spring bellows so that, when said pneumatic spring bellows is depressurized, one portion of said pneumatic spring bellows rolls over an external peripheral surface of said collar and forms an additional fold; and a covering surrounding the collar so as to form a space between an exterior peripheral surface of said collar and an interior peripheral surface of said covering, wherein a top of said covering is closed.

10. An axle suspension as claimed in claim 9, wherein the covering is formed of a flexible material and has a bottom peripheral edge that contacts, and is carried by, an outer peripheral surface of said pneumatic spring bellows.

11. An axle suspension for an air-suspended vehicle having a vehicle chassis, said axle suspension comprising:

an upper mounting plate adapted to be connected to the vehicle chassis;

a pneumatic spring bellows having a top end connected to an outer peripheral edge of said upper mounting plate;

a collar having a specified axial length and extending downwardly from the outer peripheral edge of said upper mounting plate, said collar surrounding an outer peripheral surface of said pneumatic spring bellows; and a plunger piston connected to a lower end of said pneumatic spring bellows so that, when said pneumatic spring bellows is depressurized, one portion of said pneumatic spring bellows rolls over an external peripheral surface of said collar and forms an additional fold, wherein said plunger piston is cylindrical, and a top of said plunger piston is connected to the lower end of said pneumatic spring bellows by a bottom plate.

12. An axle suspension as claimed in claim 11, wherein a lower end of said plunger piston is supported on a spring leaf assembly.

13. An axle suspension as claimed in claim 11, wherein said collar and said pneumatic spring bellows are generally cylindrically shaped.

14. An axle suspension for an air-suspended vehicle having a vehicle chassis, said axle suspension comprising:

an upper mounting plate adapted to be connected to the vehicle chassis;

a pneumatic spring bellows having a top end connected to an outer peripheral edge of said upper mounting plate;

a collar having a specified axial length and extending downwardly from the outer peripheral edge of said upper mounting plate, said collar surrounding an outer peripheral surface of said pneumatic spring bellows; and a plunger piston connected to a lower end of said pneumatic spring bellows so that, when said pneumatic spring bellows is depressurized, one portion of said pneumatic spring bellows rolls over an external peripheral surface of said collar and forms an additional fold, wherein said collar is cylindrical and has an inner diameter that is substantially the same as an outer diameter of a top portion of said pneumatic spring bellows.

15. An axle suspension as claimed in claim 14, wherein the peripheral edge of said upper mounting plate is connected to the top end of said pneumatic spring bellows by means of a bead.

16. An axle suspension as claimed in claim 14, wherein said collar rests against said upper mounting plate.

17. An axle suspension as claimed in claim 14, a lower free end of said collar is rounded.

18. An axle suspension as for an air-suspended vehicle having a vehicle chassis, said axle suspension comprising:

an upper mounting plate adapted to be connected to the vehicle chassis;

a pneumatic spring bellows having a top end connected to an outer peripheral edge of said upper mounting plate;

a collar having a specified axial length and extending downwardly from the outer peripheral edge of said upper mounting plate, said collar surrounding an outer peripheral surface of said pneumatic spring bellows; and a plunger piston connected to a lower end of said pneumatic spring bellows so that, when said pneumatic spring bellows is depressurized, one portion of said pneumatic spring bellows rolls over an external peripheral surface of said collar and forms an additional fold, wherein said collar is formed as a single piece with said upper mounting plate.

19. An axle suspension for an air-suspended vehicle having a vehicle chassis, said axle suspension comprising:

an upper mounting plate adapted to be connected to the vehicle chassis;

a pneumatic spring bellows having a top end connected to an outer peripheral edge of said upper mounting plate;

a collar having a specified axial length and extending downwardly from the outer peripheral edge of said upper mounting plate, said collar surrounding an outer peripheral surface of said pneumatic spring bellows; and a plunger piston connected to a lower end of said pneumatic spring bellows so that, when said pneumatic spring bellows is depressurized, one portion of said pneumatic spring bellows rolls over an external peripheral surface of said collar and forms an additional fold, wherein said collar is integrally connected to said upper mounting plate.

20. An axle suspension for an air-suspended vehicle having a vehicle chassis, said axle suspension comprising:

an upper mounting plate adapted to be connected to the vehicle chassis;

a pneumatic spring bellows having a top end connected to the outer peripheral edge of said upper mounting plate;

at least one collar disposed a distance below said upper mounting plate and surrounding an outer peripheral surface of said pneumatic spring bellows, said collar having a specified axial length; and a plunger piston connected to a lower end of said pneumatic spring bellows so that, when said pneumatic spring bellows is depressurized, a portion of said pneumatic spring bellows rolls over an external Peripheral surface of said collar and forms an additional fold, wherein said plunger piston is cylindrical, and a top of said plunger piston is connected to the lower end of said pneumatic spring bellows by a first bottom mounting plate.

21. An axle suspension as claimed in claim 20, wherein a lower end of said plunger piston is supported on a spring leaf assembly.

22. An axle suspension as claimed in claim 20, wherein said collar and said pneumatic spring bellows are generally cylindrically shaped.

23. An axle suspension for an air-suspended vehicle having a vehicle chassis, said axle suspension comprising:

an upper mounting plate adapted to be connected to the vehicle chassis;

a pneumatic spring bellows having a top end connected to the outer peripheral edge of said upper mounting plate;

at least one collar disposed a distance below said upper mounting plate and surrounding an outer peripheral surface of said pneumatic spring bellows, said collar having a specified axial length;

a plunger piston connected to a lower end of said pneumatic spring bellows so that, when said pneumatic spring bellows is depressurized, a portion of said pneumatic spring bellows rolls over an external peripheral surface of said collar and forms an additional fold; and a second pneumatic spring bellows arranged in said plunger piston, and a second plunger piston connected to a bottom end of said second pneumatic spring bellows, wherein said second pneumatic spring bellows is connected to the top of said plunger piston by means of a second bottom mounting plate.

\* \* \* \* \*